Patented Nov. 10, 1925.

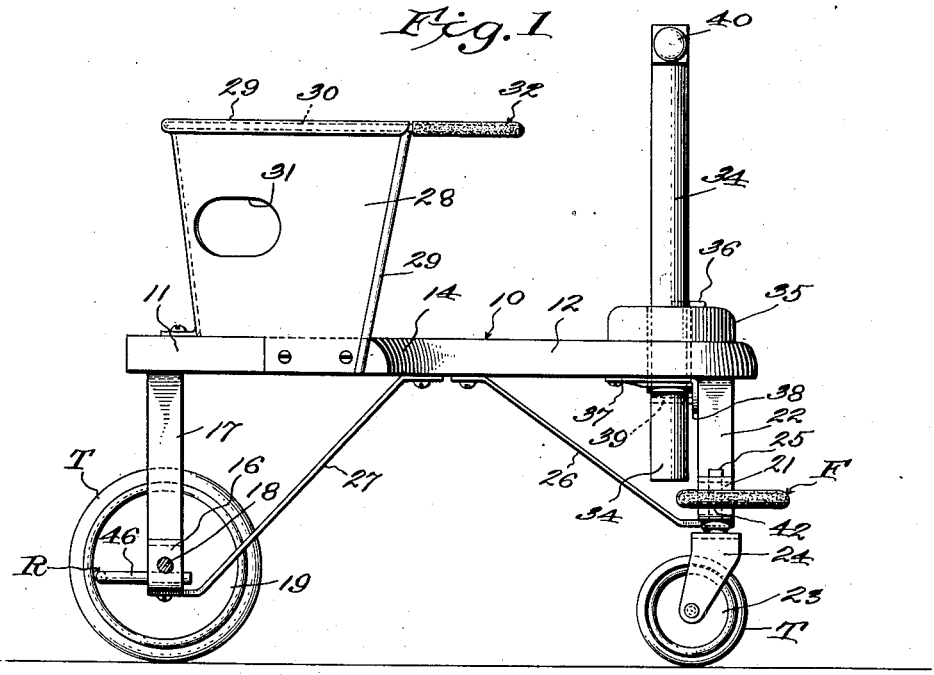
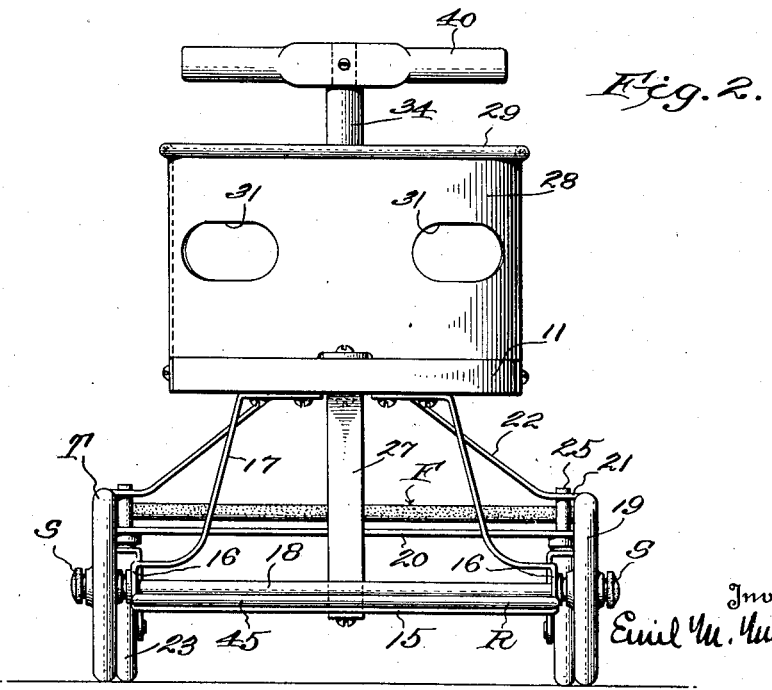

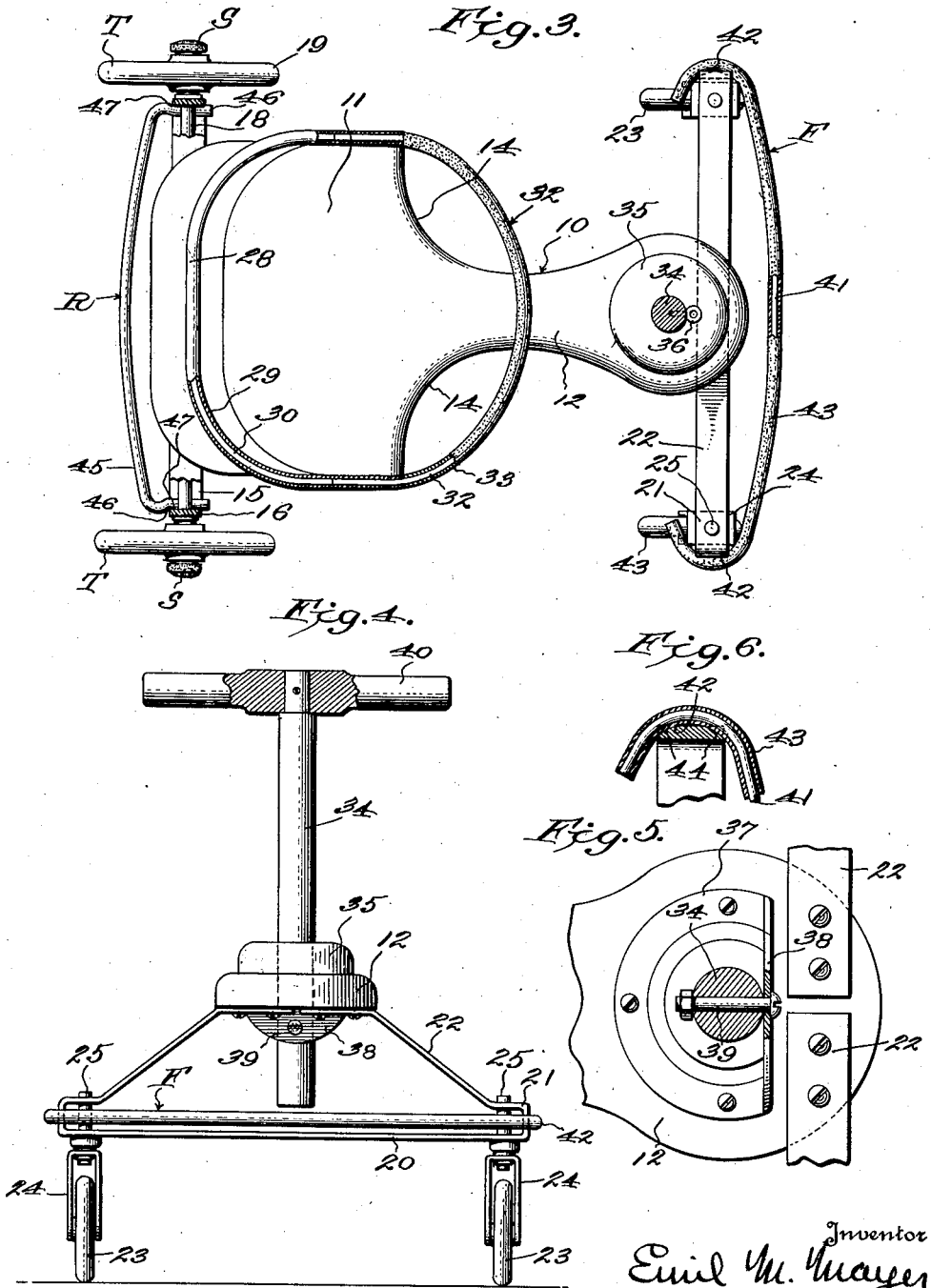

1,561,264

UNITED STATES PATENT OFFICE.

EMIL M. MAYER, OF NEWPORT, KENTUCKY, ASSIGNOR TO NEWPORT MANUFACTURING COMPANY, OF NEWPORT, KENTUCKY, A CORPORATION OF KENTUCKY.

CHILD'S VEHICLE.

Application filed September 12, 1924. Serial No. 737,307.

*To all whom it may concern:*

Be it known that I, EMIL M. MAYER, a citizen of the United States of America, and resident of Newport, county of Campbell, State of Kentucky, have invented certain new and useful Improvements in and Relating to Children's Vehicles, set forth in the annexed specification.

This invention relates to certain improvements in children's vehicles; and the nature and objects of the invention will be readily recognized and understood by those skilled in the arts involved in the light of the following explanation and detailed description of the accompanying drawings illustrating what I now believe to be the preferred embodiments or mechanical expressions of the invention from among various other forms, arrangements, combinations and constructions of which the invention is capable within the spirit and scope thereof.

The invention is primarily aimed and directed to a type of vehicle for use by a child in learning to walk, and which forms a support and guide for the child to prevent its falling from the vehicle and to maintain the child's body in the proper position, while permitting the necessary freedom of movement of the legs in walking, with the feet on and in contact with the floor or other surface upon which the vehicle rests. With this type of vehicle it is of fundamental importance that the same cannot be tipped or caused to fall over by the child with possible resulting injury, and yet the vehicle must be of such a construction as to be readily and easily propelled by the child with but small physical effort, and afford the child a maximum degree of comfort while seated thereon or in position to walk therewith. A further consideration met with in the foregoing type of vehicle, is the requirement for a simple but strong design and construction which will stand up under the usage to which subjected by a child, without being of too great a weight or too cumbersome for ready handling and for storage in a restricted space, such as found indoors where such vehicles are generally kept when not in use.

Therefore, in view of the foregoing conditions, one of the basic objects of the present invention is to provide a design and construction of a child's vehicle of the above referred to general type, in which a child can readily assume the natural position for walking, with the feet upon the floor or other surface upon which the vehicle is supported, and have sufficient room for leg movements, while being supported and confined against falling from the vehicle; and further to so design and arrange the elements of the vehicle as to distribute the weight of a child therein, particularly when in walking position, so that the vehicle cannot be tipped over and upset by the efforts of a child in using the vehicle.

Another object of the invention is the provision of a child's vehicle of the type referred to, in which the seat of the vehicle is provided with a detachable element which forms with the seat, the supporting and confining structure for a child in walking position, as well as for confining a child in seated position on the vehicle, and which element when detached converts the seat to open, unobstructed form.

Another object of the invention is to provide a vehicle of the foregoing general types, which is of simple but strong construction affording the maximum of attractiveness and of comfort to a child therein, and easily propelled by the child with a minimum of effort.

With the foregoing general objects, and certain other objects and results in view, which other objects and results will be readily apparent to those familiar with this art from the following description, the invention consists in certain novel features in construction and in combinations and arrangements of elements, as will be more fully and particularly referred to and specified hereinafter.

Referring to the accompanying drawings, in which similar reference characters indicate corresponding elements throughout:

Fig. 1 is a view in side elevation of a child's vehicle embodying the several features of the invention.

Fig. 2 is a view in rear elevation of the vehicle of Fig. 1.

Fig. 3 is a view in top plan of the vehicle of Fig. 1.

Fig. 4, is a view in front elevation of the forward frame and wheels with the bumper thereon, and showing the steering or hand post of the vehicle.

Fig. 5, is a detail fragmentary view of the mounting of the forward wheel frame and of the mounting of the steering or hand post on the body of the vehicle.

Fig. 6, is a detail fragmentary view, partly in section, of the construction of the front bumper and forward wheel frame, showing the manner of mounting and locking the bumper on the frame in mounted applied position.

One possible form and embodiment of a vehicle presenting the principles and various features of the invention is illustrated in the accompanying drawings and described herewith purely by way of example and not of limitation, for the purpose of explaining the invention so that the same will be readily understood by those skilled in this art. Certain features of the invention are not confined or limited to the specific type or form of vehicle disclosed, but are applicable to use with and embodiment in vehicles generally, as will appear from the following explanation of the various features of the invention in the form and application thereof, of the present example.

In the illustrated form of the invention the child's vehicle of the type hereinbefore referred to, embodies the substantially flat body or bed 10 having the relatively wide rear portion forming the seat 11, and the relatively narrow or reduced portion 12 extending centrally and forwardly therefrom in longitudinal continuation thereof. The forward side of the seat 11 of body 10 at opposite sides of the narrow forward portion 12 is formed with the edge portions thereof curved forwardly and inwardly to and continued in the reduced forward portion 12 of the body to provide the opposite curved shoulders 14 on the forward end of seat 11 at opposite sides of the reduced portion 12 of the body 10.

The vehicle body or bed 10, so formed, is mounted and supported upon wheels carried by front and rear supporting frames on which the body or bed is secured. The rear frame of the vehicle embodies a transversely disposed lower bar 15 having the opposite ends thereof bent upwardly to provide the axle receiving and mounting members 16, and then extended inwardly and upwardly to form the frame side members 17 secured at their upper ends to the body 11 adjacent the rear end of seat 11. Thus, the rear frame is mounted disposed transversely across and depending from the under side of seat 11 to form a support therefor, as will be clear by reference to Figs. 1 and 2 of the drawings in particular. A rear axle 18 is mounted in the opposite members 16 of the rear frame and extends across and above the lower bar 15 of the frame, and outwardly a distance beyond the members 16, respectively. Rear wheels 19 are mounted on the opposite extended ends of the axle 18, and are confined and maintained thereon in the usual or any other desired manner. It will here be noted that the lower end of the rear frame, including the lower frame bar 15, is of greater width than the width of the seat portion 11 of the vehicle body 10, and extends outwardly beyond the seat, so that the rear wheels 19 are disposed below the seat 11 and spaced outwardly from opposite sides thereof. (See Figs. 2 and 3.)

The front frame of the vehicle for supporting the forward reduced or narrow portion 12 of the body or bed 10, is of a type similar to the rear frame above described and embodies the lower transversely disposed cross bar or rod 20 turned upwardly and then inwardly a distance at the opposite ends thereof to provide members 21 for receiving and mounting the front wheel assemblies. The inwardly turned portions of the frame members 21 are extended inwardly and upwardly to and secured at their upper ends on and to the lower or under side of the forward end of the vehicle body or bed 10, in any suitable manner, and form the frame side members 22. The front frame is of less height or depth than the rear frame, due to the type of front wheel and the mounting thereof employed, which necessitates such formation of the front frame in order to maintain the body 10 in the desired substantially horizontally disposed position. Front wheel assemblies of the swivel or caster type are mounted at opposite ends of the front frame in position depending therefrom, and embody the wheels 23 of relatively large diameter mounted in the forks 24 which are swivelled or rotatably mounted on the lower ends of the pins or stub shafts 25 which are secured and mounted in vertically disposed position extending upwardly through the opposite end frame members 21, respectively. In mounted position the front wheels 23 are disposed beneath opposite ends of the front frame and are freely rotatable or swingable around and on vertical axes formed by the pins or stub shafts 25 mounted in the frame. The vehicle so formed with the body or bed 10 mounted on and supported by the front and rear wheeled frames is readily propelled and easily steered or guided in any desired direction through the swivelled or laterally swingable front wheels 23, by pushing or turning the front or forward end of the body 10 in the proper direction which will cause the front frame which is fixed to the body 10, to pivot or swing on the wheel forks 24 and permit the wheels to properly follow the direction of movement of the forward end of the vehicle, as will be readily understood.

The front wheel frame is braced and strengthened by a brace rod 26 extending centrally from the lower frame bar 20, and upwardly and rearwardly to the body or bed 10, and the rear wheel frame is strengthened by a similar brace rod 27 extending centrally from the lower frame bar 15, and forwardly and upwardly to the bed 10. The brace rods or bars 26 and 27 are secured to the under side of the bed 10 at the central portion thereof, and serve to prevent displacement or bending of the wheel frames from the bed by stresses applied thereto longitudinally of the vehicle.

The rear or seat bottom forming portion 11 of the vehicle body or bed 10, is provided with a seat back and side forming member 28, embodying in the present instance, a strip or sheet of material, preferably metal, bent or curved to semi-circular shape and secured at the back thereof to the upper side of seat bottom 11 at a point slightly forwardly of the rear wheel frame and at the side portions to opposite side edges of the seat 11. The member 28 is secured in position extending upwardly from the back and side portions of the seat 11, with the rear or seat back of the member 28 inclined rearwardly, and the upper edge thereof, and front edges of the side portions formed with a bead 29. A stiff wire 30 is enclosed in and extends through the upper edge bead 29 to provide a strengthening and shape retaining element for the member 28, and terminates a distance within the bead from the opposite forward ends thereof, respectively. The sides of the member 28 are secured to the body 10 adjacent the curved shoulders 14 and the forward beaded edges 29 are inclined upwardly and forwardly a distance beyond the outer ends of these shoulders, as clearly shown in Fig. 1 of the drawings. Openings 31 are formed through the member 28 to reduce the weight thereof and to provide for ventilation.

A confining and supporting member 32 of semi-circular form and preferably constructed from relatively stiff wire, is detachably mounted on the upper forward ends of the seat member 28 and extends across the open forward side thereof, forwardly therefrom and in substantial continuation of the upper semi-circular beaded edge 29 of the member 28. The confining and supporting member 32 is mounted on the seat member 28 by inserting the ends thereof into the forward ends of the bead 29 until they contact with the ends of the wire 30 in the bead, which form limiting stops therefor. A rubber or other suitable protecting cover 33, such as tubing or the like is placed over that portion of member 32 which is exposed in mounted position. The member 32 can be readily slipped into mounted or attached position, or withdrawn and removed from the member 28, but preferably a sufficiently tight fit is obtained to prevent too easy displacement in use.

At the forward end of the vehicle body or bed 10 a steering post or column 34 is vertically mounted extending through the reduced portion 12 of the bed to the rear of the front wheel frame, and depends downwardly a distance below the bed 10. The post 34 is rotatably mounted in the bed 10 and a bearing block or collar 35 is mounted on the upper side of the bed through which the post 34 is journaled. A pin or the like 36 in the post 34 bears on the upper side of collar 35 and maintains the post in the proper position against downward movement. On the under side of the bed 10, a plate 37 formed with a central aperture, is secured surrounding post 34, which extends therethrough. The plate 37 is formed at the forward side with a lip 38 bent downwardly therefrom into position adjacent post 34, and a removable bolt, pin or the like 39 extends through lip 38 and the steering post 34 to prevent the latter from rotating. The foregoing arrangement of plate 37 is shown particularly by Fig. 5 of the accompanying drawings. The post 34 extends upwardly a distance above bed 10 and is provided at the upper end thereof with a cross bar or handle bar 40, in the usual manner familiar in this art. With the steering post 34 so mounted, when it is desired to convert the vehicle to a hand steered one, the bolt 39 is withdrawn to permit free rotation of post 34, the front frame with wheels 23 is detached and removed from the body 10, and any suitable front wheel (not shown) is then detachably mounted on the lower end of post 34, to form the supporting wheel for the forward end of the vehicle.

The type of child's vehicle above described and illustrated in the accompanying drawings is generally used, as well as stored, indoors and to prevent damage to furniture; woodwork and the like, the invention provides an arrangement of protective elements at points on the vehicle liable to strike against adjacent objects. In order to prevent the forward end of the body 10 of the vehicle, and the front wheel frame thereof from striking a protective bumper F is mounted on the front wheel frame extending thereacross and projecting forwardly a distance beyond the frame and the forward end of the body or bed 10, as shown in Figs. 1 and 3. The front bumper F embodies a length of spring or resilient material such as spring wire or the like 41 slightly bowed and bent at the opposite ends into the hooks 42. A protective covering such as the relatively soft rubber tube 43 (see Fig. 6) is applied over and enclosing the spring wire 41 to provide a non-damaging contact surface. The opposite sides of the members 21 of the front wheel frame are notched or cut out at 44 on their front and rear edges, as clearly shown in Fig. 6 of the accompanying drawings, and the bumper F is mounted on the front wheel frame by springing the opposite end hooks 42 over the sides of the frame members 21, respectively, and into the notches 44. The bumper F is held in mounted position extending across the front of the vehicle by the hooks 42 and the inherent resiliency or spring of the wire 41 from which formed.

A rear bumper R is detachably mounted and supported on the rear wheel frame and extends rearwardly between the rear wheels 19. The bumper R comprises a length of resilient or spring wire, or the like, 45 slightly bowed, and bent at the opposite ends to form the attaching arms 46. These arms 46 are offset or otherwise suitably formed on their inner sides to provide the seats or depressions 47, as shown in Fig. 3 of the drawings. The bumper R is provided with a suitable protective covering, such as the soft rubber tubing on bumper F, and is mounted on the rear wheel frame by springing the arms 46 toward each other and slipping the same between the opposite axle mounting members 16 of the rear frame, with the members 16 received in the seats 47 on the arms 46 and locking the bumper in mounted position. The bumper R is retained in mounted position by the construction as described, due to the spring or resiliency of the material from which formed and extends between the rear wheels 19 and projects a distance rearwardly beyond the rear end of the seat 11 of body 10.

The rear wheels 19 are provided with rubber tires T, and as the wheels 19 project rearwardly beyond the end of body 10, the rear end of the vehicle is therefore provided with protective elements formed by the bumper R and tires T, which will engage adjacent objects without injury and prevent either the rear wheel frame or the rear end of the body from striking and injuring any object. Similarly, the swivelled front wheels 23 are provided with tires T, which in cooperation with the front rubber covered bumper F prevent any injury from engagement by the front end of the vehicle.

The invention further eliminates damage by contact with the outwardly projecting ends of the rear axle 18, through the provision of relatively soft rubber caps S which are mounted over and cover the outer ends of the axles, as well as extending across the hubs of wheels 19. Thus, by the foregoing arrangement of front and rear bumpers F and R, and rubber caps S, in cooperation with the rubber tires T of the front and rear wheels, the vehicle in effect is protected by non-marring surfaces at all points thereon which will strike or engage adjacent objects, so that with a vehicle of this type used by a child indoors, all damage to furniture, woodwork and such like is practically eliminated.

However, no claim is herein made to the above features of the invention providing the protective elements for the vehicle, namely, the bumpers, rubber wheel tires, and the axle caps, as these features are presented by and claimed in my copending U. S. patent application filed July 27, 1925, Serial No. 46,309.

When the vehicle hereinbefore described is used for a child learning to walk, the confining and supporting member 32 is attached to the seat member 28 by inserting the ends thereof in the forward ends of the upper edge bead 29, as previously explained. In mounted position the confining member 32 extends forwardly from the seat member 28 above and over the shoulders 14 at the forward end of the seat portion 11 of body 10. The child is placed in the seat member 28 on the seat portion 11 of the body with the legs disposed on opposite sides of the reduced forward portion 12 of the body and over the shoulders 14. The member 32 confines the child in the seat member 28, and the child can place its feet on the floor and grasp the handle bar 40 on the steering post 34, while supported and guided in natural walking position by seat member 28 and the forwardly extended confining member 32. When in this position, by moving the legs with the feet in contact with the floor the vehicle is readily propelled by the child. Attention is directed to the mounting of the seat member on the body 10 at points adjacent but forwardly of the rear wheel frame with confining member supported and extended forwardly therefrom, so that weight or forces applied to member 32 by a child, are transmitted by member 28 to the rear portion of the body 10 forward of the points of support by the rear wheels 19. This arrangement and mounting prevents overturning the vehicle by forces applied to the forward portion or sides of member 32. Due to the wide tread provided by the wheels and to the mounting of the wheel frame at the extreme forward and rear ends of the body 10, overturning or upsetting of the vehicle by a child therein is practically eliminated, as will be clear by reference to the drawings in connection with the foregoing explanation thereof.

The vehicle as formed provides the necessary freedom of leg movement for a child in walking position therein and affords a maximum of comfort and safety. With the ease with which the vehicle can be propelled, a child can be placed therein and be readily amused thereby, while being safely guarded from falling therefrom and against upsetting or tipping the vehicle over. The construction and arrangement of the various elements provide a vehicle of the requisite strength to meet the severe requirements in use, while the elimination of damage to adjacent objects renders the vehicle of great utility for indoor use and storage.

It is evident that various changes, modifications, variations and substitutions might be resorted to without departing from the spirit and scope of the invention, and hence I do not desire to limit myself to the exact and specific disclosures hereof.

Desiring to protect my invention in the broadest manner legally possible, what I claim is:

1. In a child's vehicle, a body formed with an enlarged rear seat portion and a reduced forward portion, wheeled supporting frames for said body, a seat back and side forming member secured on and extending upwardly from the seat portion of said body, and a confining member mounted on and supported solely from said seat forming member and extending forwardly from the upper forward ends thereof and thereacross above the reduced forward portion of the body.

2. In a child's vehicle, a substantially flat body formed with an enlarged seat forming portion and a reduced portion extending forwardly therefrom, wheeled supporting frames for said body, a substantially semi-circular sheet material seat back and side forming member mounted on the seat portion of said body with the open side forward, the upper edge of said member formed with a bead therearound open at its forward ends, and a child confining and supporting member embodying a rod bent into semi-circular form and detachably mounted on said seat member by forcing the ends thereof into the open forward ends of the upper edge bead, said confining and supporting member extending forwardly from said seat member in substantial continuation of the bead thereof, above and across the forward reduced portion of the body.

3. In a child's vehicle, a body, a steering post rotatably mounted in vertical position extending therethrough, and means for locking said post against rotation, comprising an apertured plate fixedly mounted to the under side of the body over and around said post, a lip extending from said plate adjacent the post, and a removable member extending through said lip and the steering post to lock the latter against rotation.

4. In a child's vehicle, a body formed of a seat member and a forwardly extending member, wheeled supporting frames for said body, a side and back seat support on said seat member of the body, said seat support reinforced at its upper edge, a child confining and supporting member formed of a rod bent into semi-circular form and connected to the reinforced edge of said seat member at the forward ends thereof, said confining and supporting member extending forwardly from said seat member in substantial continuation of the reinforced top edge of the seat support member.

In testimony whereof I have hereunto set my hand at Newport, Kentucky, this 18th day of August, 1924.

EMIL M. MAYER.